(12) United States Patent
Villacres Mesias et al.

(10) Patent No.: US 10,793,077 B2
(45) Date of Patent: Oct. 6, 2020

(54) CARABINER-STYLE CARGO HOOK

(71) Applicant: FORD GLOBAL TECHNOLOGIES, LLC, Dearborn, MI (US)

(72) Inventors: Diego Fabricio Villacres Mesias, San Mateo Atenco (MX); Humberto Memetla Martinez, Benito Juarez (MX); Joaquín Andrés Araya Salinas, Cuajimalpa de Morelos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/827,829

(22) Filed: Nov. 30, 2017

(65) Prior Publication Data

US 2019/0161020 A1  May 30, 2019

(51) Int. Cl.
*B60R 7/08* (2006.01)
*F16B 45/02* (2006.01)
*B60R 13/02* (2006.01)

(52) U.S. Cl.
CPC ............ *B60R 7/08* (2013.01); *B60R 13/0206* (2013.01); *F16B 45/02* (2013.01)

(58) Field of Classification Search
CPC .............................. B60R 7/08; B60R 13/0206
See application file for complete search history.

(56) References Cited

U.S. PATENT DOCUMENTS

| | | | | |
|---|---|---|---|---|
| 978,734 A * | 12/1910 | Gordon | ................ | F21L 19/003 248/304 |
| 2,121,440 A * | 6/1938 | Morrison | .................. | A45F 5/02 24/3.6 |
| 2,312,985 A * | 3/1943 | Bales | ..................... | A47F 5/0823 248/220.43 |
| 2,787,435 A * | 4/1957 | Shields | ................ | A47G 1/1686 16/87.2 |
| 3,163,392 A * | 12/1964 | Husted | .................. | A47F 5/0823 211/96 |
| 3,861,631 A * | 1/1975 | Shorin | ................... | A47B 96/06 248/546 |
| 3,972,093 A * | 8/1976 | Aimar | ...................... | B68G 7/08 24/114.3 |
| 5,139,324 A * | 8/1992 | West | ........................ | G02C 3/04 248/206.1 |
| 5,507,460 A * | 4/1996 | Schneider | ........... | A61M 5/1418 24/601.2 |
| 5,624,094 A * | 4/1997 | Protz, Jr. | ................. | F16B 45/02 24/375 |
| 5,639,140 A | 6/1997 | Labrash | | |

(Continued)

FOREIGN PATENT DOCUMENTS

DE    102013100661 A1    7/2014
EP       2329992 A2      6/2011
(Continued)

OTHER PUBLICATIONS

English Machine Translation of DE102013100661A1.

*Primary Examiner* — Anita M King
(74) *Attorney, Agent, or Firm* — David Coppiellie; King & Schickli, PLLC

(57) ABSTRACT

A carabiner-style hook is provided for managing cargo. The hook includes a body having a first resilient section, a second section and a gate defined between the first resilient section and the second section.

14 Claims, 18 Drawing Sheets

(56) References Cited

U.S. PATENT DOCUMENTS

| | | | | |
|---|---|---|---|---|
| 5,769,294 A * | 6/1998 | Heinz | .................... | B60R 7/02 |
| | | | | 224/544 |
| 5,855,347 A * | 1/1999 | Hollingsworth | ..... | A47B 96/061 |
| | | | | 211/59.1 |
| 5,984,250 A * | 11/1999 | Connor | .............. | A47G 25/0607 |
| | | | | 24/599.1 |
| 6,266,250 B1 * | 7/2001 | Foye | .................... | H02B 1/043 |
| | | | | 211/41.17 |
| 6,443,409 B1 * | 9/2002 | Zanzucchi | ............. | B43M 15/00 |
| | | | | 248/216.1 |
| 7,837,248 B2 | 11/2010 | Nedelman | | |
| 7,900,883 B2 * | 3/2011 | Portz | ................ | A47G 25/0607 |
| | | | | 248/215 |
| 8,973,961 B1 | 3/2015 | Setsuda et al. | | |
| 9,695,975 B2 * | 7/2017 | Ogawa | ................ | F16M 13/022 |
| 10,307,022 B1 * | 6/2019 | Cole | ...................... | A63B 57/20 |
| 2004/0084918 A1 | 5/2004 | Brandt et al. | | |
| 2006/0103186 A1 | 5/2006 | Sturt et al. | | |
| 2017/0129412 A1 | 5/2017 | Lewis et al. | | |
| 2020/0079271 A1 * | 3/2020 | Villacres Mesias | .... | F16B 45/02 |

FOREIGN PATENT DOCUMENTS

| | | | |
|---|---|---|---|
| EP | 2062783 B1 | 3/2014 | |
| EP | 2604870 B1 | 5/2016 | |

* cited by examiner

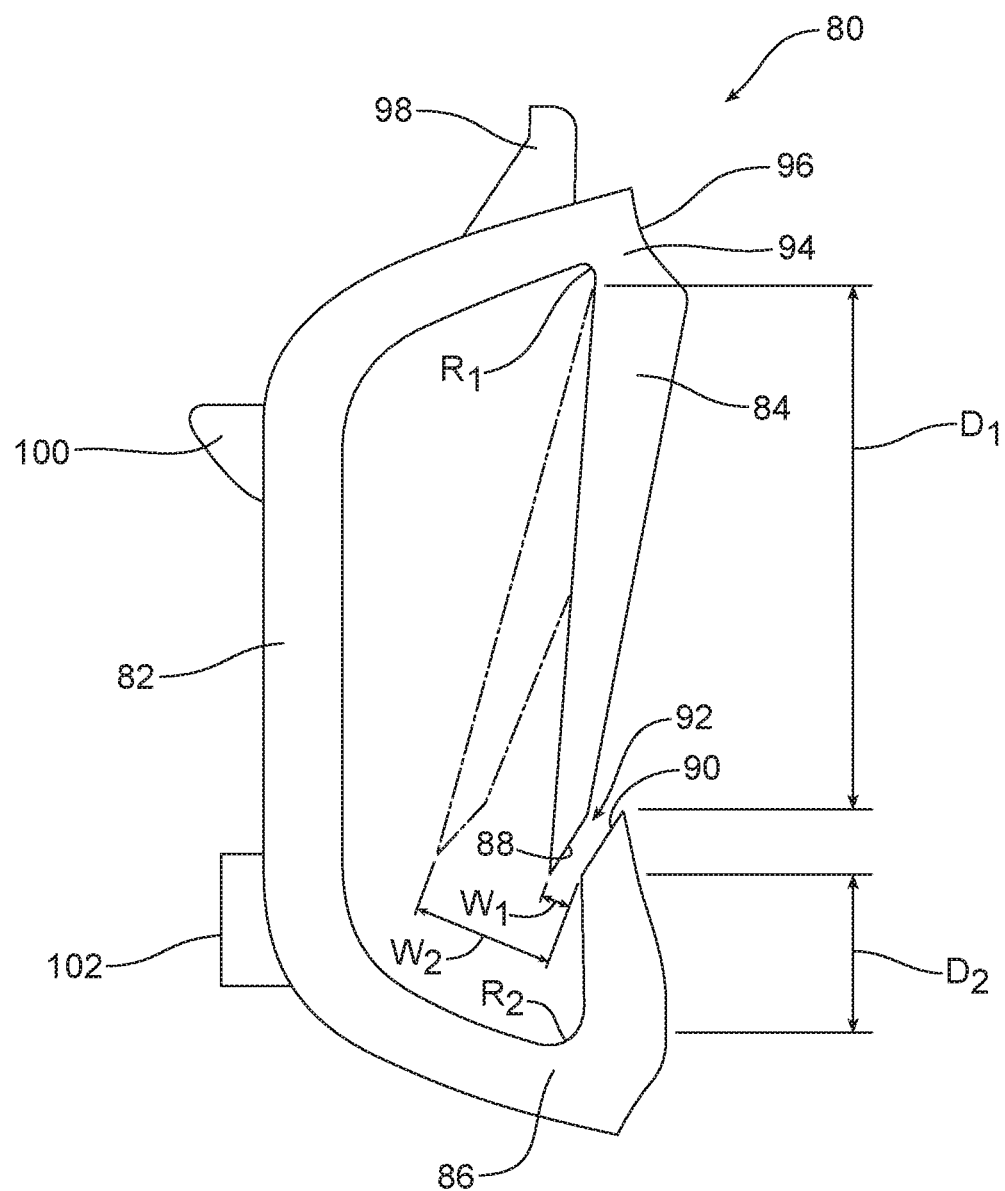

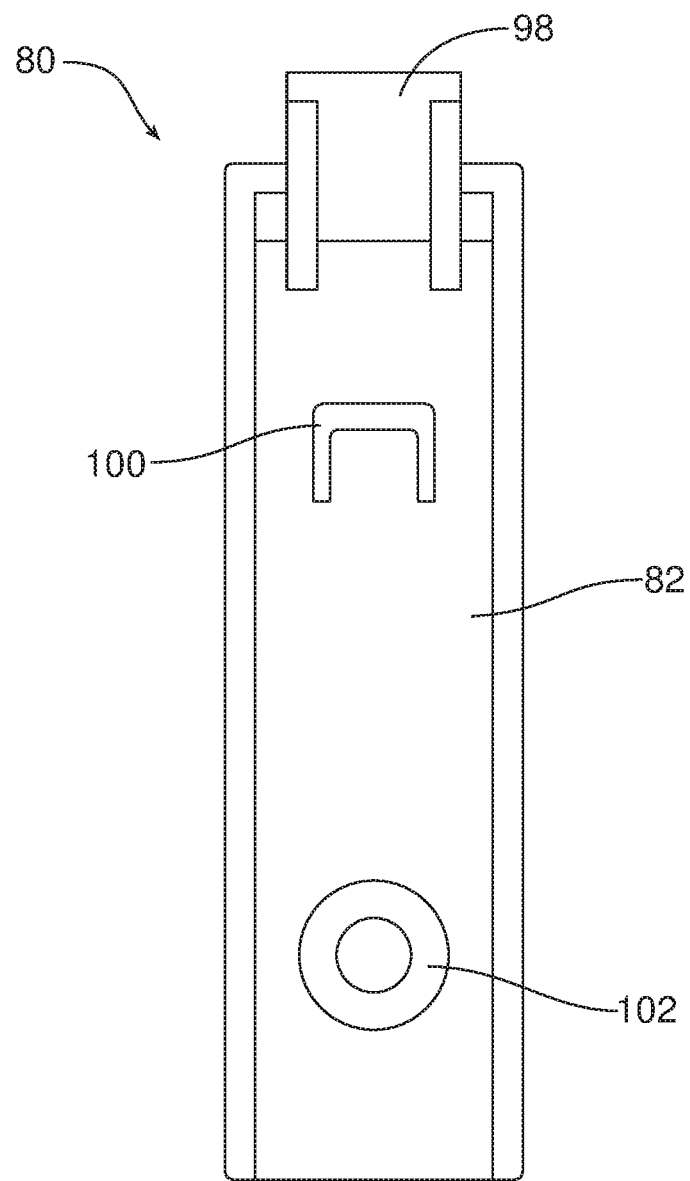

CARABINER-STYLE CARGO HOOK

TECHNICAL FIELD

This document relates generally to the vehicle equipment field and, more particularly, to a carabiner-style cargo hook that is inexpensive to produce while providing added versatility for managing a wide range of items including, but not limited to, bungee hooks, cargo nets, climbing gear and camping gear in, for example, a motor vehicle.

BACKGROUND

Current utility vehicles such as sport utility vehicles, hatchbacks and minivans, feature either closed loop cargo tie-downs or open, grocery bag hooks. Such features are commonly located in the quarter trim panels, load floors or lift gate scuff plates.

Closed loop tie-down anchors require their counterpart to either be a line, rope, strap or clipping hook in order for them to be coupled. They are also commonly located under the belt line not far from the cargo load floor. This limits the amount of items you can attach to features of this type.

Grocery hooks and open hooks, on the other hand, are typically located higher in the vehicle but items hung there can detach spontaneously under certain road conditions. Additionally, they are designed to withstand very limited loads which affect their versatility.

This document relates to a new and improved carabiner-style hook that has increased versatility and will function with a wide range of counterparts in order to better manage cargo in a motor vehicle.

SUMMARY

In accordance with the purposes and benefits described herein, a new and improved hook is provided. That hook is carabiner-style and comprises a body including a first resilient section, a second section and a gate defined between the first resilient section and the second section.

The first resilient section may have a first inner radius $R_1$ and the second section may have a second inner radius $R_2$ where $R_1 < R_2$. The first resilient section may be displaceable between a home position providing the gate with a first gap width $W_1$ and a deflected position providing the gate with a second gap width $W_2$ where $W_1 < W_2$.

The first resilient section may have a first distal end face. The second section may have a second distal end face. The gate may extend between the first distal end face and the second distal end face. The first distal end face may have a length $L_1$ and the second distal end face may have a length $L_2$ where $L_1 < L_2$.

The body may include a base. The body may be made from a single piece of molded plastic. Further, the base may include a mounting lug and a locating rib. In addition the base may include a screw boss.

In at least one of the many possible embodiments of the hook, the first resilient section may include a living hinge. In such an embodiment, the first resilient section may have a first distal end face, the second section may have a second distal end face and the gate may extend between the first distal end face and the second distal end face.

The second section may overlap the first resilient section. Further, the body may include a mounting lug and a locating rib. Still further, the body may include a screw boss.

In at least one of the many possible embodiments of the hook, the hook may further include a concave housing having a receiver to receive and hold the body. That body may include a screw boss aligned with the gate across the body. Still further, the first inner radius $R_1$ may be spaced from the first distal end face by a first distance $D_1$ while the second inner radius $R_2$ may be spaced from the second distal end face by a second distance $D_2$ where $D_1 < D_2$. The ratio of $D_1$ to $D_2$ may be between 2:1 and 3:1. In at least one of the many possible embodiments the ratio of $D_1$ to $D_2$ is about 2:1. In at least one of the many possible embodiments the ratio of $D_1$ to $D_2$ is about 3:1.

In the following description, there are shown and described several preferred embodiments of the hook. As it should be realized, the hook is capable of other, different embodiments and its several details are capable of modification in various, obvious aspects all without departing from the hook as set forth and described in the following claims. Accordingly, the drawings and descriptions should be regarded as illustrative in nature and not as restrictive.

DETAILED DESCRIPTION

The accompanying drawing figures incorporated herein and forming a part of the specification, illustrate several aspects of the hook and together with the description serve to explain certain principles thereof.

FIG. 1b is a detailed front elevational view of the hook illustrated in FIG. 1a.

FIG. 2b is a detailed front elevational view of the hook illustrated in FIG. 2a.

FIG. 3a is a detailed side elevational view of a third embodiment of a hook.

FIG. 3b is a front elevational view of the hook illustrated in FIG. 3a.

FIG. 3c is a rear elevational view of the hook illustrated in FIGS. 3a and 3b.

Figure 1A:
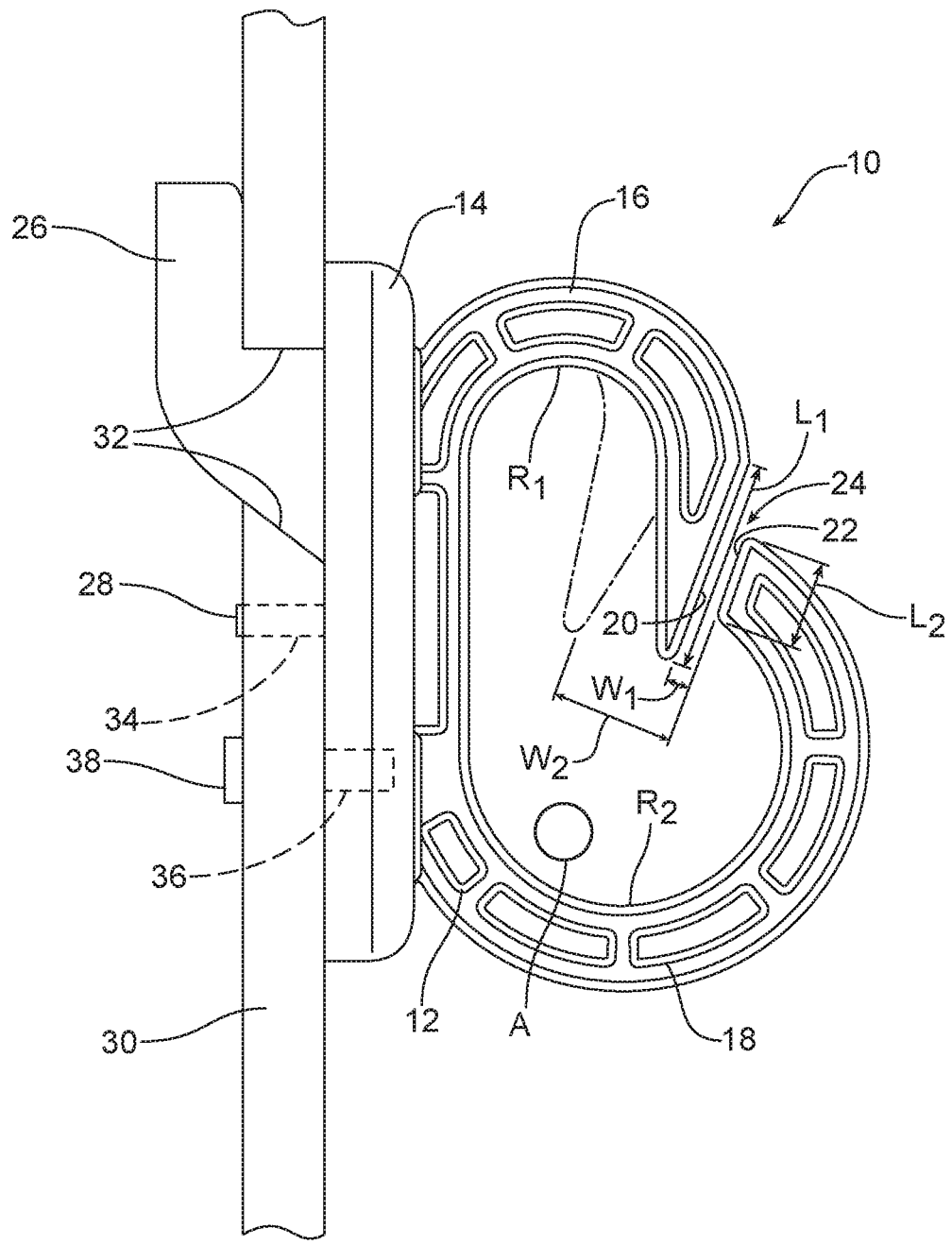
FIG. 1a is a detailed side elevational view of a first embodiment of the hook shown attached to a trim panel.
Figure 1B:
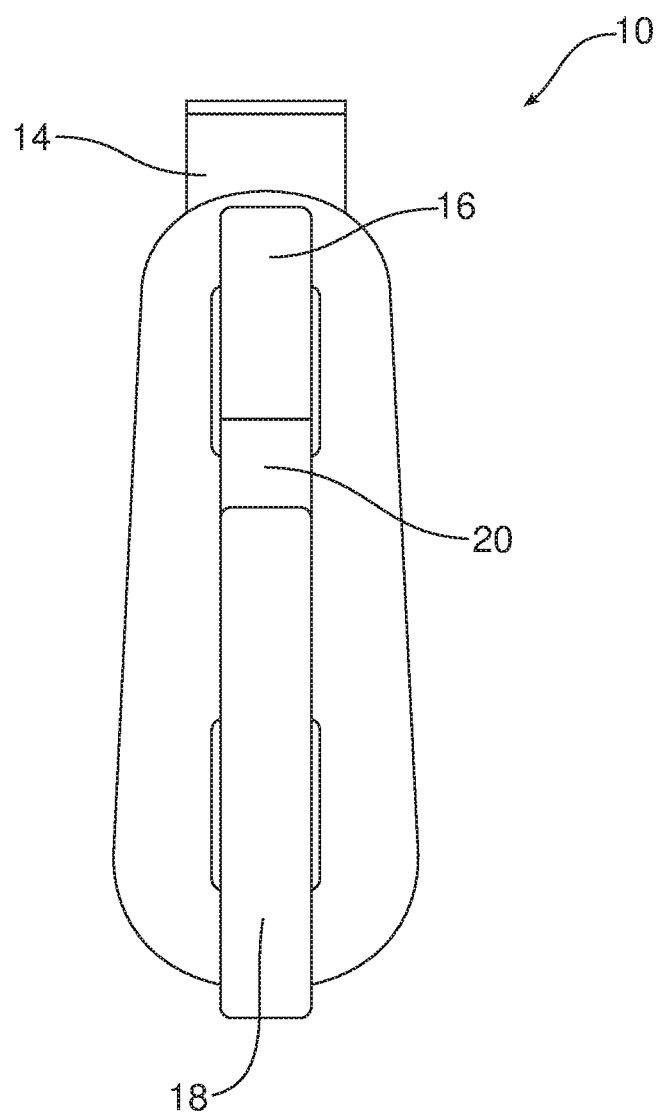
Figure 1C:
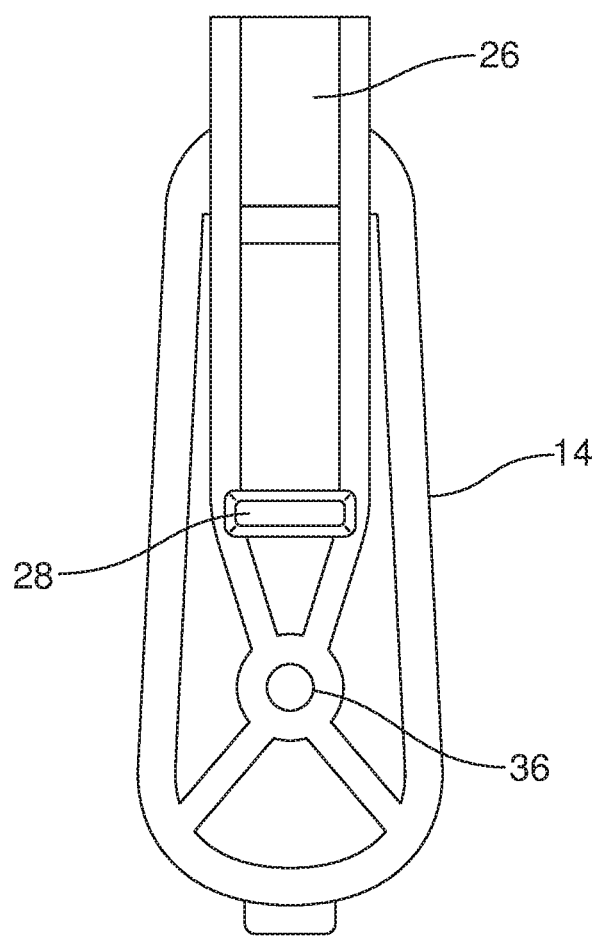
FIG. 1c is a rear elevational view of the hook illustrated in FIGS. 1a and 1b.
Figure 1D:
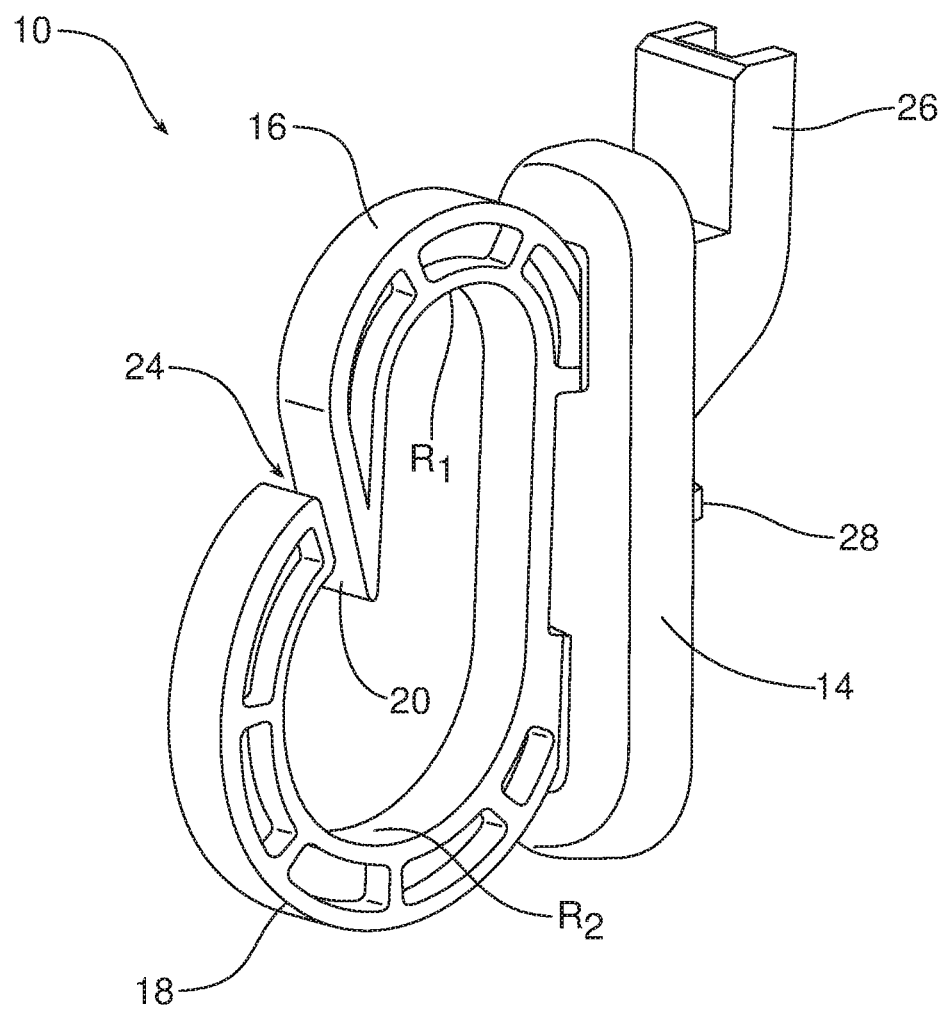
FIG. 1d is a perspective view of the hook illustrated in FIGS. 1a-1c.

Reference will now be made in detail to the present preferred embodiments of the hook, examples of which are illustrated in the accompanying drawing figures.

DETAILED DESCRIPTION

Reference is now made to FIGS. 1a-1d illustrating a first possible embodiment of a hook 10. That hook 10 includes a body 12 and a base 14, a first resilient section 16 and a second section 18. In the illustrated embodiment, the first resilient section 16 and the second section 18 both depend from the base 14.

The first resilient section 16 has a first inner radius $R_1$. The second section 18 has a second inner radius $R_2$ where $R_1<R_2$. The first resilient section 16 has a first distal end face 20. The second section 18 has a second distal end face 22. A gate 24, in the form of a gap or passageway, extends between the first distal end face 20 and the second distal end face 22. As should be further appreciated from reviewing FIGS. 1a-1d, the first distal end face 20 has a length $L_1$ while the second distal end face 22 has a length $L_2$ where $L_1>L_2$. Thus it should be appreciated that the first distal end face 20 overlaps the second distal end face 22 at the gate 24.

The first resilient section 16 is displaceable between a home position, illustrated in full line in FIG. 1a, providing the gate 24 with a first gap width $W_1$ and a deflected position, illustrated in phantom line in FIG. 1a, providing the gate with a second gap width $W_2$ where $W_1<W_2$. Thus, it should be appreciated that one may displace the first resilient section 16 to the deflected position in order to open the gate 24 to receive a rope, tie-down loop, hook or other counterpart device for securing cargo to the hook 10. Upon releasing the first resilient section 16, that section snaps back to the home position illustrated in full line. In the home position the width of the gate 24 is reduced and the counterpart attachment A is captured within the hook 10 to provide a secure connection.

As should be further appreciated from reviewing FIG. 1a, the base 14 includes a mounting lug 26 and a locating rib 28 used to secure the hook 10 to a trim panel 30 of a motor vehicle. More specifically, the mounting lug 26 is inserted through a first opening 32 in the trim panel 30 and then the hook 10 is pivoted to bring the locating rib 28 into engagement with a second opening 34 in the trim panel 30.

The base may also include a screw boss 36. A screw fastener 38 passing through the trim panel 30 and engaging in the screw boss 36 may be utilized to secure the hook 10 in the desired position on the trim panel.

Reference is now made to FIGS. 2a-2e illustrating a second possible embodiment of a hook 50. The hook 50 includes a body 52 having a first resilient section 54 and a second section 56. The first resilient section 54 has a first inner radius $R_1$ while the second section 56 has a second inner radius $R_2$ where $R_1<R_2$.

The first resilient section 54 also has a first distal end face 58 while the second section 56 has a second distal end face 60. A gate 62 extends between the first distal end face 58 and the second distal end face 60.

Figure 2A:
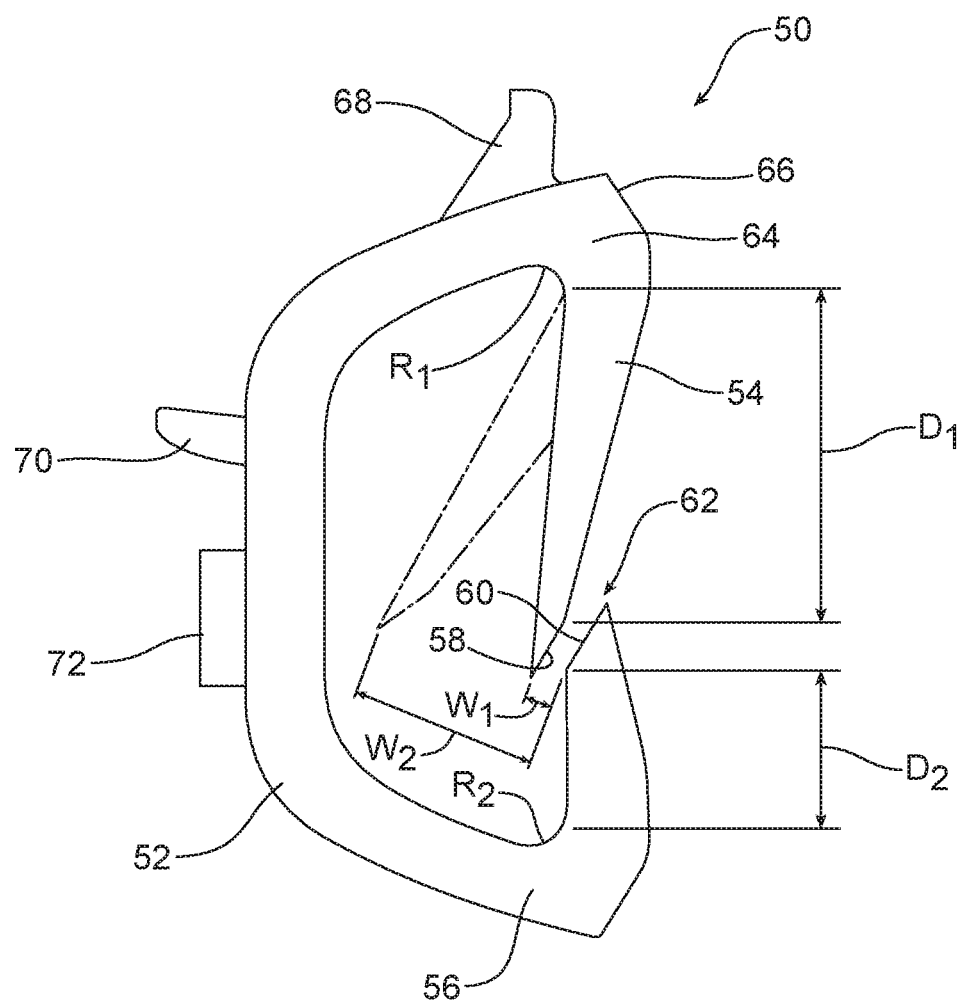
FIG. 2a is a detailed side elevational view of a second embodiment of a hook.
Figure 2B:
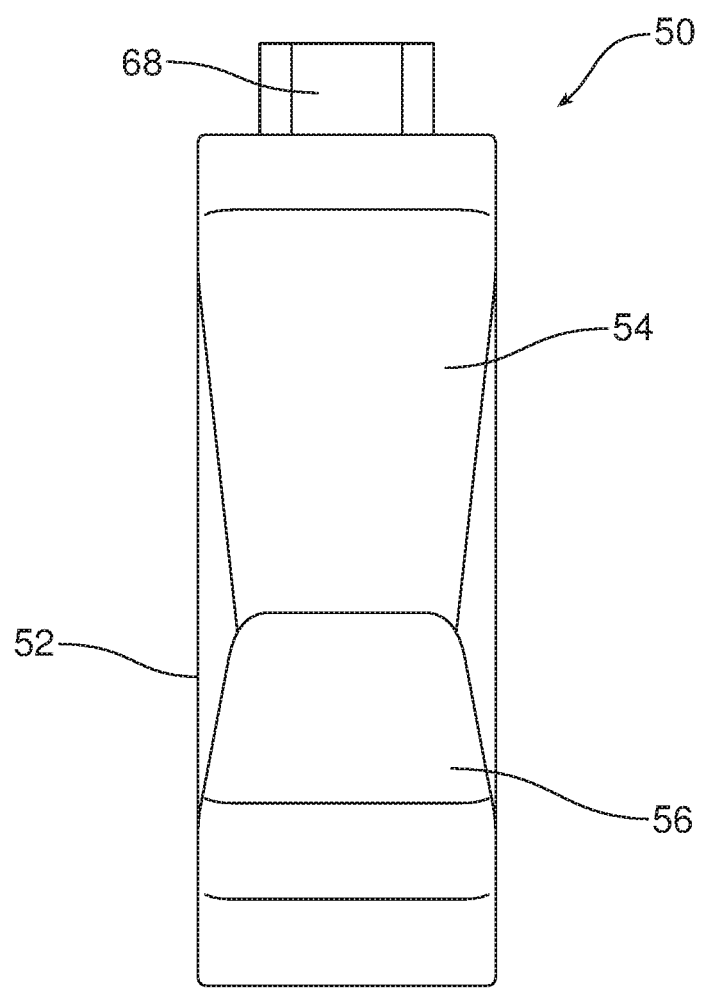
Figure 2C:
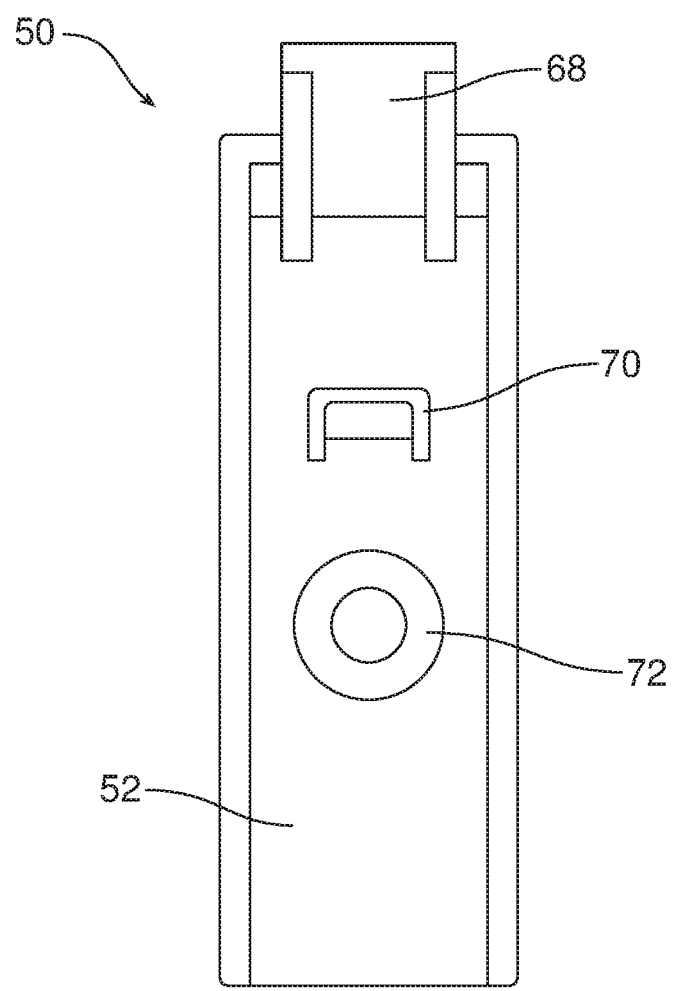
FIG. 2c is a rear elevational view of the hook illustrated in FIGS. 2a and 2b.
Figure 2D:
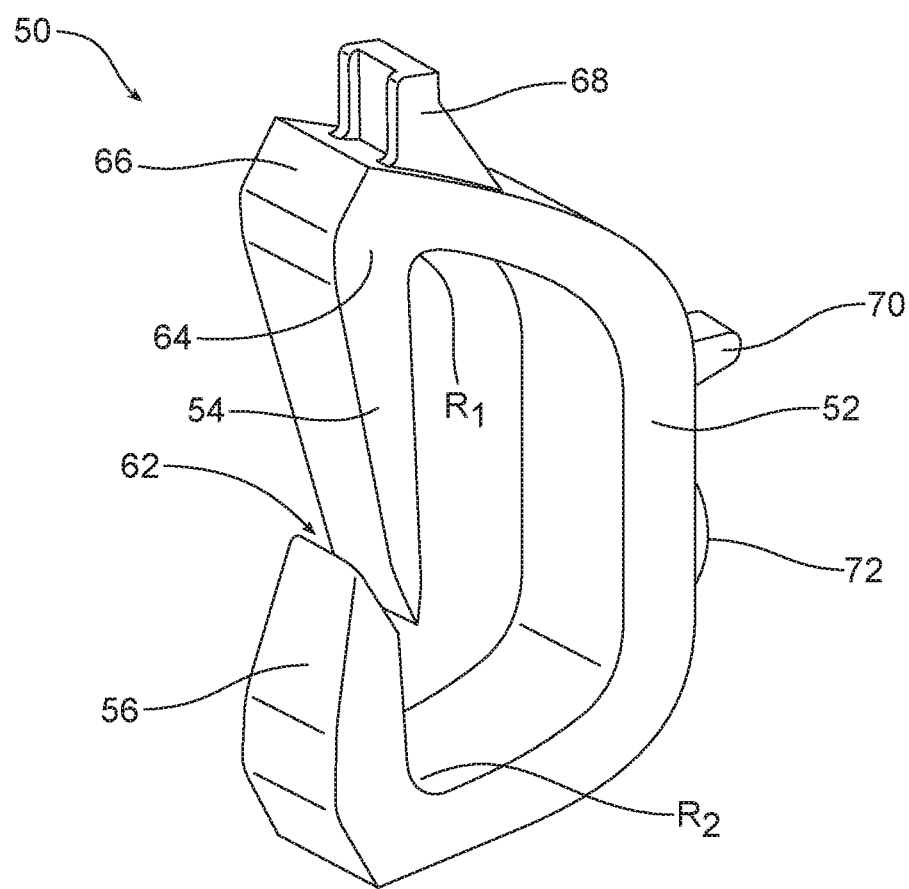
FIG. 2d is a perspective view of the hook illustrated in FIGS. 2a-2c.
Figure 2E:
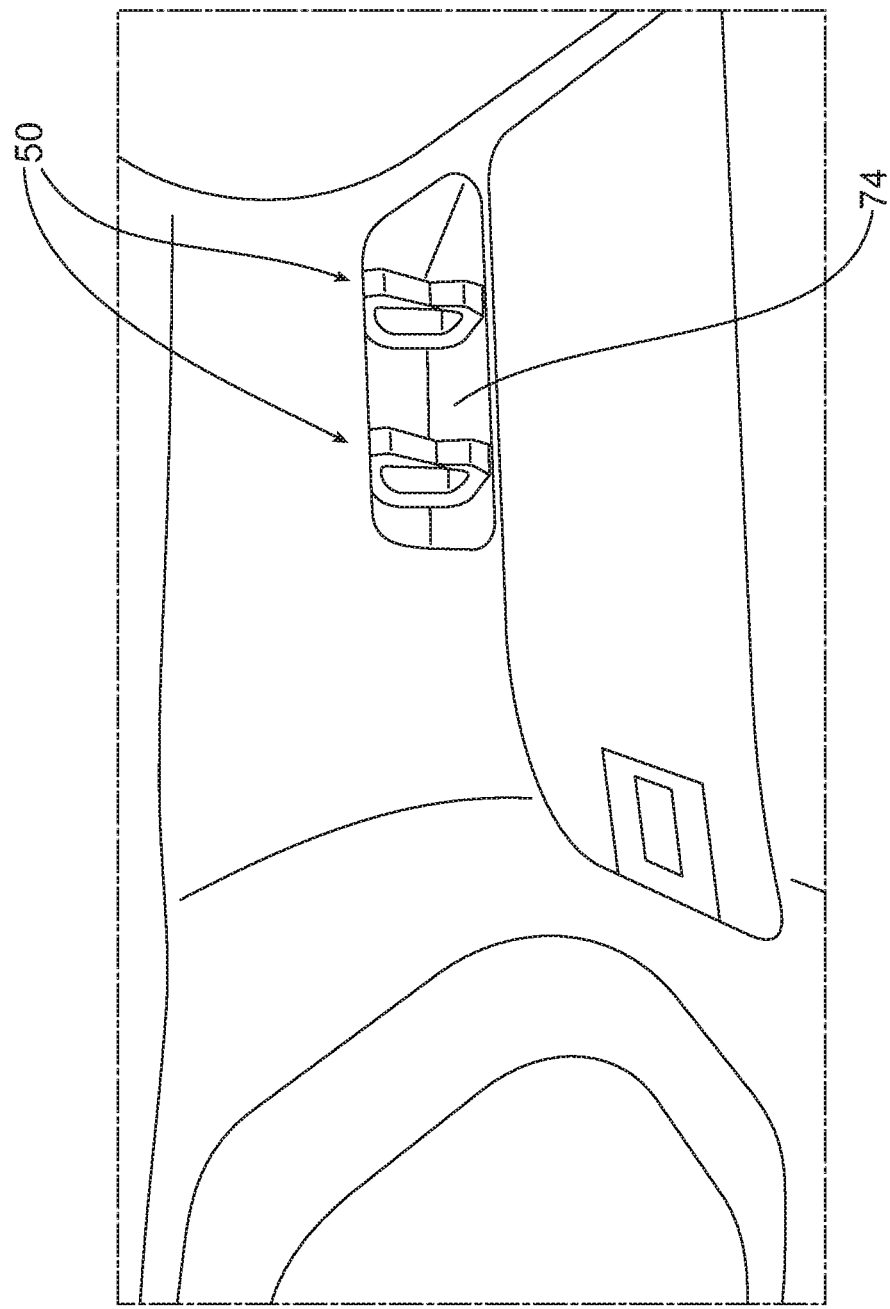
FIG. 2e is a perspective view of the hook held in a receiver of a concave housing located in a trim panel of a motor vehicle.

The first resilient section 54 is displaceable between a home position, illustrated in full line in FIG. 2a, providing the gate 62 with a first gap width $W_1$ and a deflected position, illustrated in phantom line in FIG. 2a, providing the gate with a second gap width $W_2$ where $W_1<W_2$. Thus, it should be appreciated that when desired, one may displace the first resilient section 54 into the deflected position in order to open the gate 62 for the receipt of a counterpart connecting device or attachment element. Upon release of the first resilient section 54, that first resilient section 54 snaps back into the home position closing the gate 62 to a narrower gap which resists removal of the connecting device/attachment element from the hook 50.

More specifically, as best illustrated in FIG. 2a, the first resilient section 54 includes a living hinge 64 defined between the inner radius $R_1$ and the stress concentrator 66 which allows the first resilient section 54 to be more flexible.

The body 52 of the second embodiment of the hook 50 illustrated in FIGS. 2a-2e further includes a mounting lug 68, a locating rib 70 and a screw boss 72 that allow the hook 50 to be mounted to a concave housing 74. A screw (not shown) passing through the concave housing and engaging the screw boss 72 completes the connection.

Reference is now made to FIGS. 3a-3f illustrating a third embodiment of the hook 80 having a body 82 including a first resilient section 84 and a second section 86. The first resilient section 84 includes a first inner radius $R_1$. The second section 86 includes a second inner radius $R_2$ where $R_1<R_2$.

The first resilient section 84 also includes a first distal end face 88 while the second section 86 includes a second distal end face 90. A gate 92 extends between the first distal end face 88 and the second distal end face 90.

The first resilient section 84 includes a living hinge 94 provided between the first inner radius $R_1$ and the stress concentrator 96 that allows the first resilient section 84 to be more flexible and therefore bend about the living hinge 94 between the home position illustrated in full line in FIG. 3a and the deflected position illustrated in phantom line in FIG. 3a. As should be appreciated, the gate 92 has a first gap width $W_1$ in the home position of the first resilient section 84 and a second gap width $W_2$ in the deflected position of the first resilient section where $W_1<W_2$. Thus, it should be appreciated that one may displace the first resilient section 84 about the living hinge 94 to open the gate 92 to provide a wider gap width in order to assert an attachment element.

Upon release of the first resilient section 84, the first resilient section returns by resilient memory to the home position, closing the gap width of the gate 92 and capturing the attachment element on the hook 80. Of course, one may release the attachment element from the hook 80 at any time by once again displacing the first resilient section 84 to the deflected position and opening the gap width of the gate 92 to allow the free and easy passage of the attachment element from the hook 80.

Figure 3B:
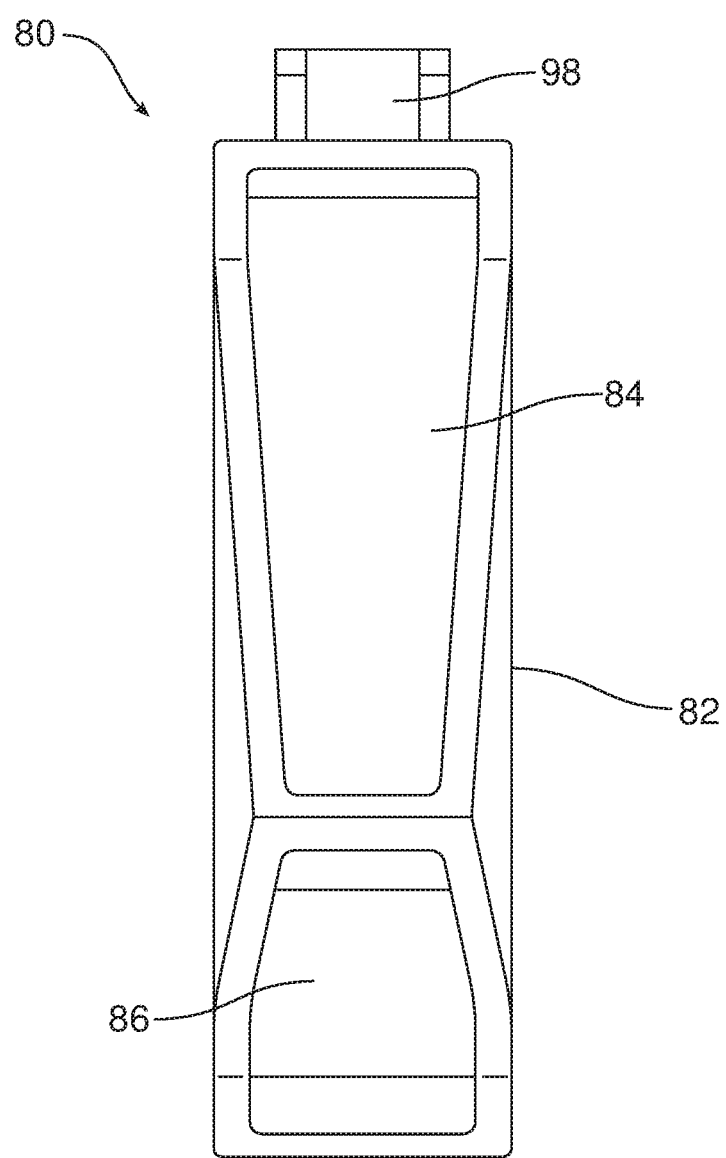
Figure 3D:
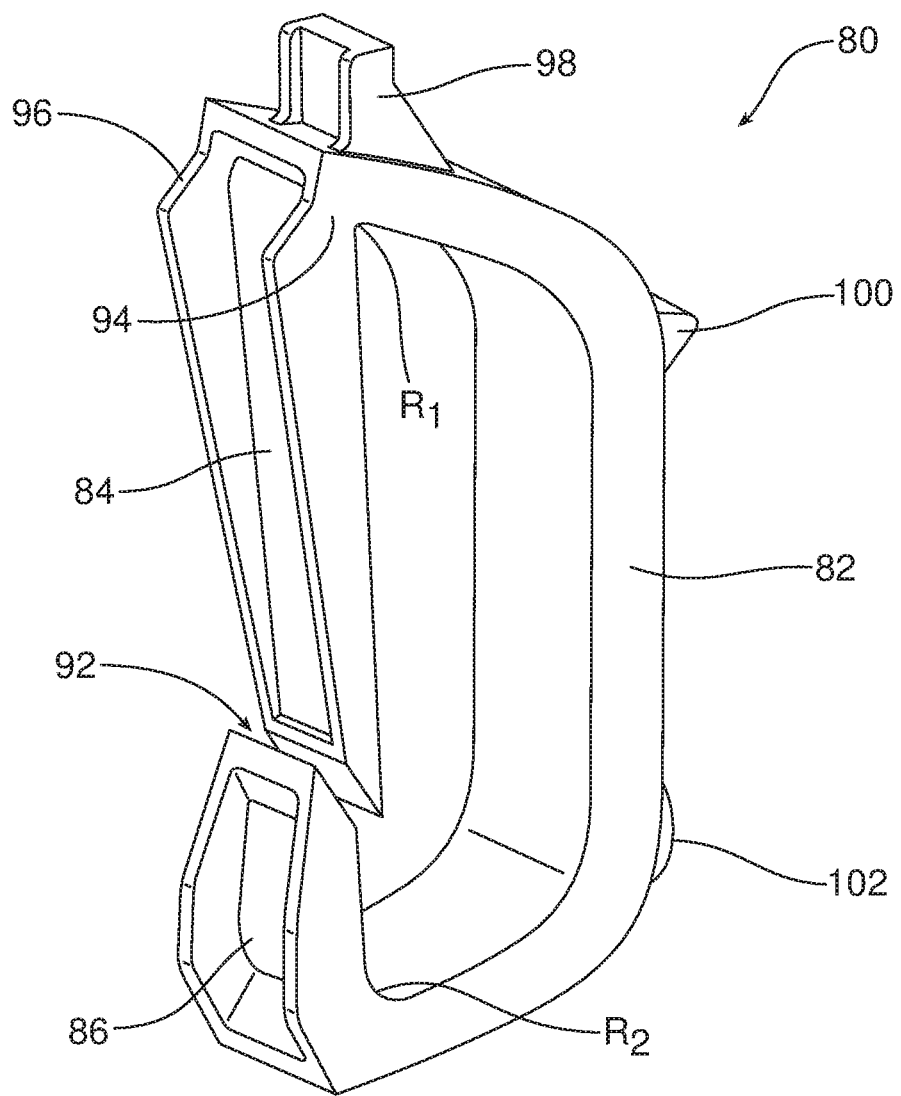
FIG. 3d is a detailed perspective view of the hook illustrated in FIGS. 3a-3c.
Figure 3E:
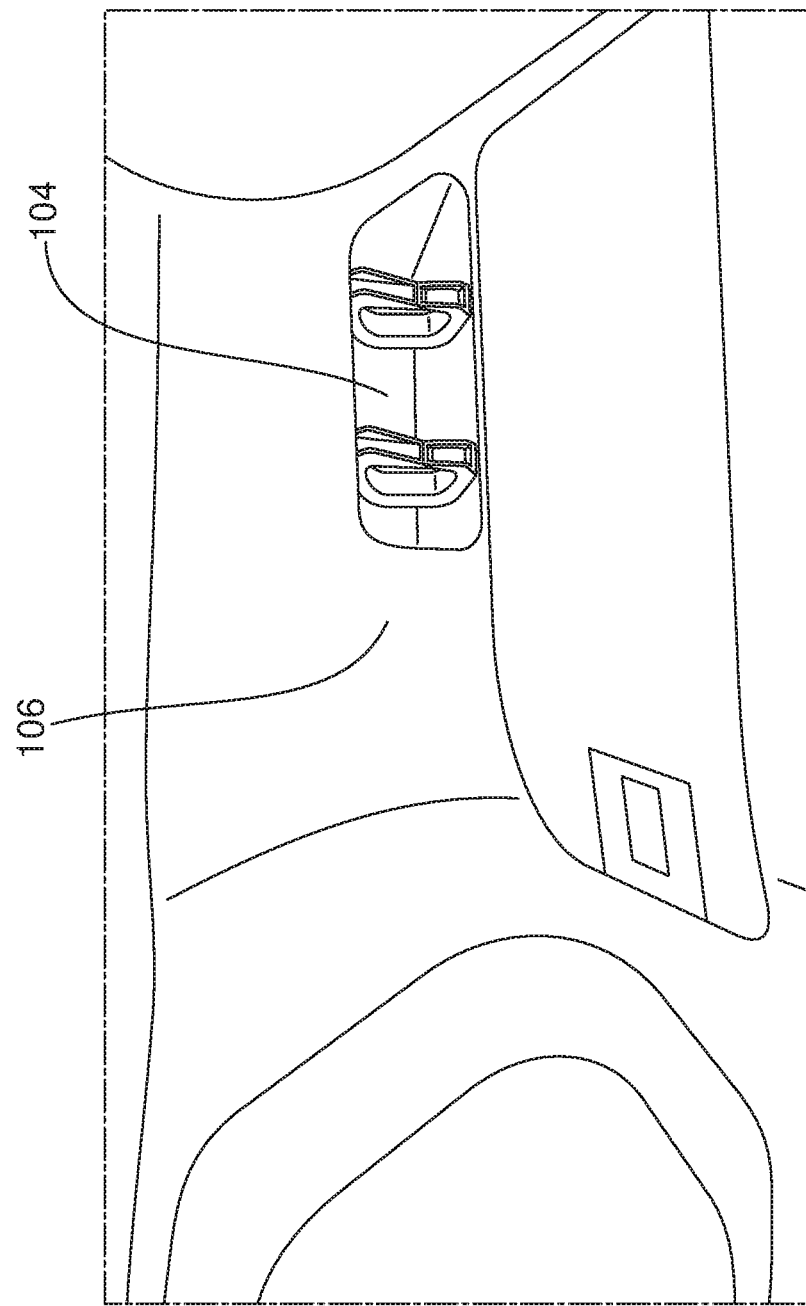
FIG. 3e is a perspective view of the hook illustrated in FIGS. 3a-3d held in a receiver provided in a concave housing along the rear quarter trim panel of a motor vehicle.
Figure 3F:
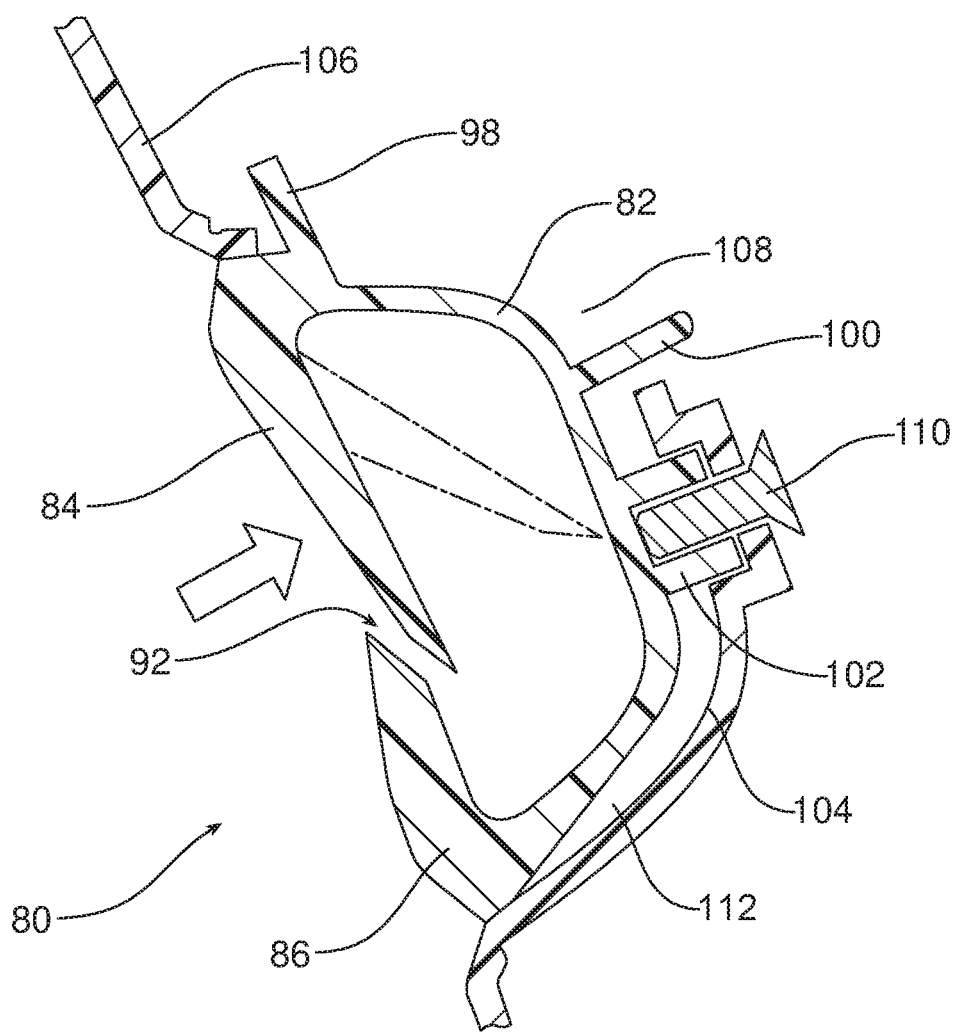
FIG. 3f is a detailed cross sectional view of the hook and receiver of FIG. 3e.

As best illustrated in FIG. 3a, the body 82 also includes a mounting lug 98, a locating rib 100 and a screw boss 102. As illustrated in FIG. 3e, the mounting lug 98, locating rib 100 and screw boss 102 allow the hook 80 to be mounted to a concave housing 104 carried on a trim panel 106 of a motor vehicle. As best illustrated in FIG. 3f, the concave housing 104 includes a receiver 108 that receives and holds the mounting lug 98 and the locating rib 100. A screw fastener 110 extends through the concave housing 104 and engages in the screw boss 102 in order to complete the connection and secure the hook 80 within the concavity 112 of the concave housing 104. This allows the hook 80 to be recessed in the contour line C of the trim panel.

Figure 4A:
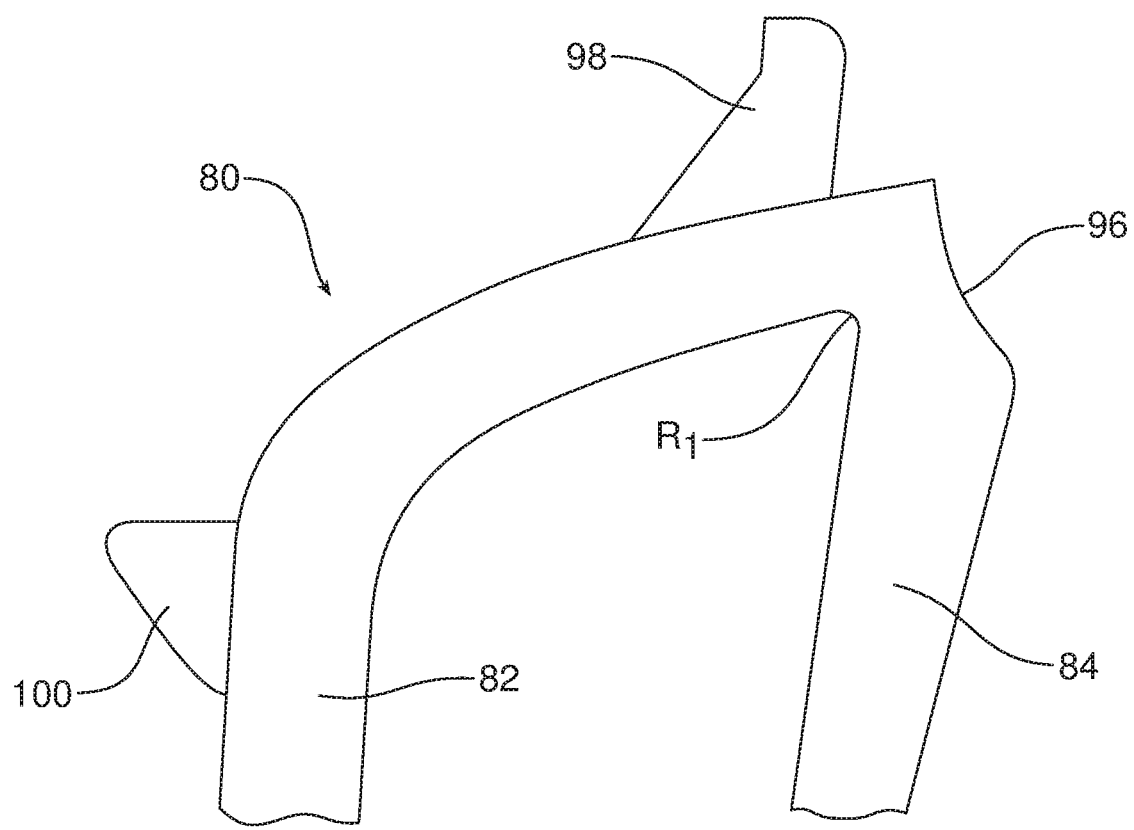
FIGS. 4a-4c are a series of views illustrating three different hook geometries for reducing and controlling stress along the living hinge of the first resilient section of the hooks.
Figure 4B:
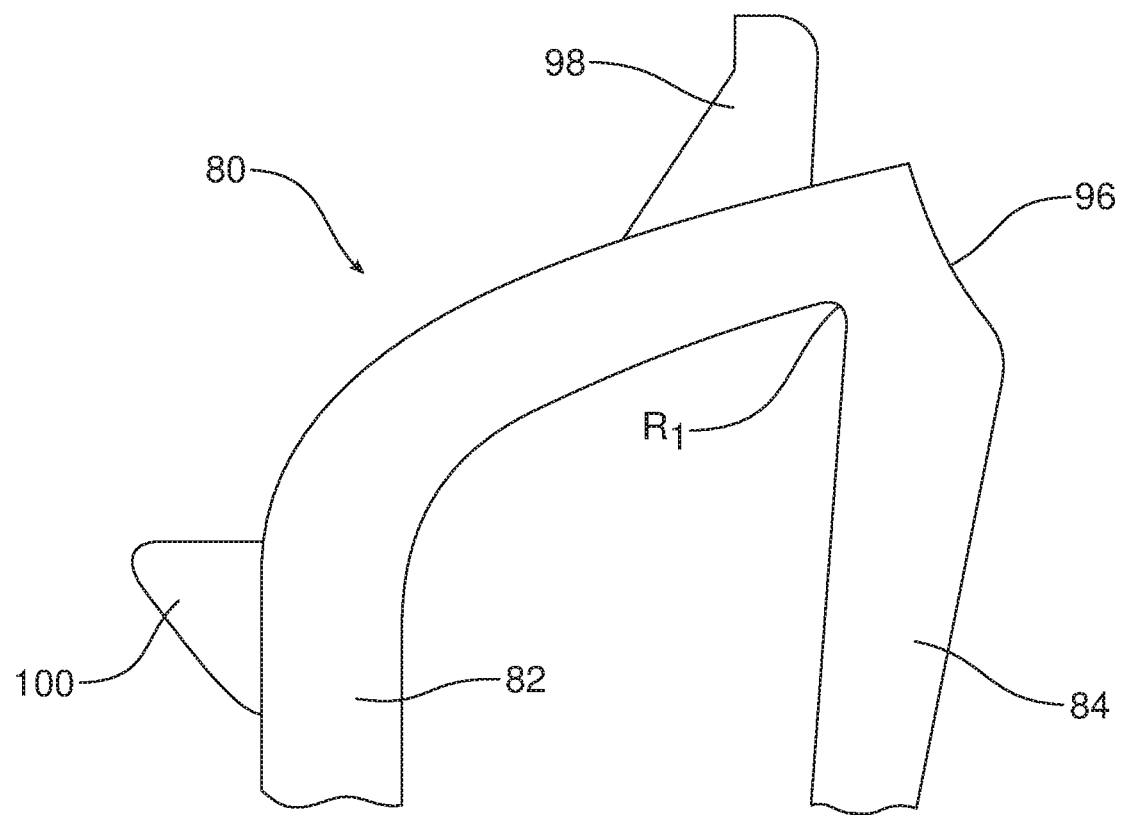
Figure 4C:
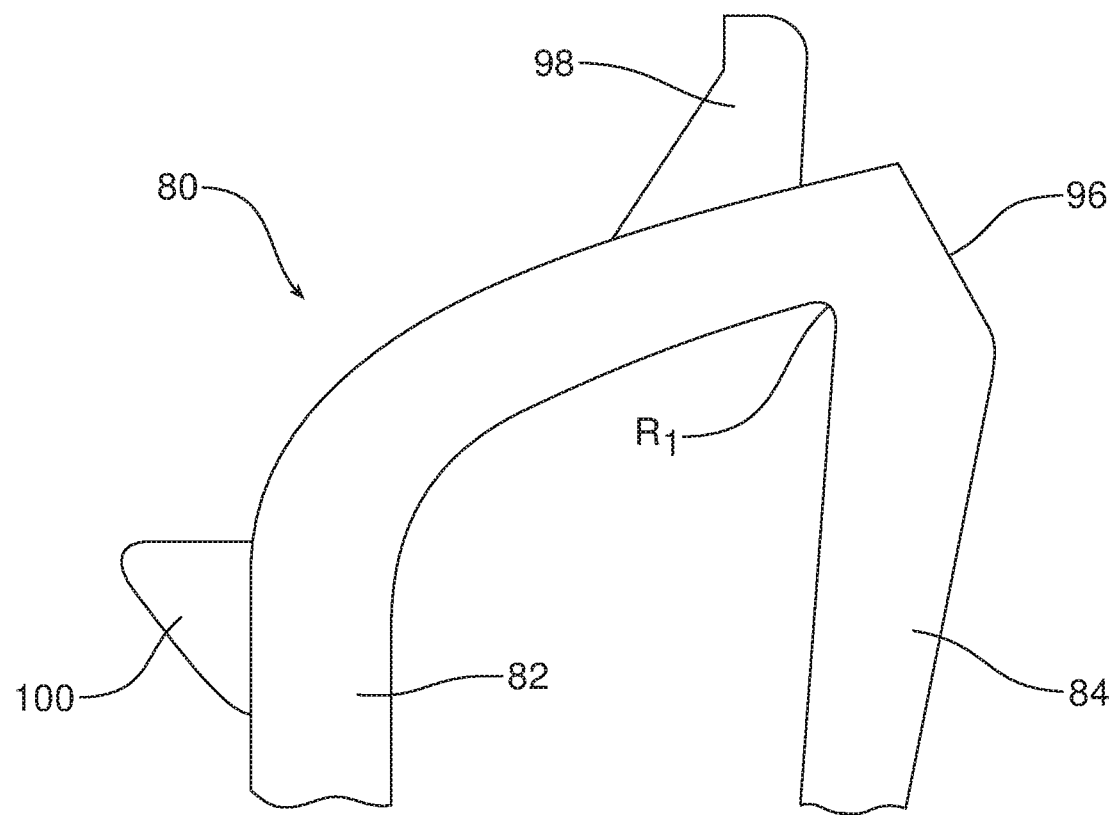

Reference is now made to FIGS. 4a-4c illustrating hooks 80 having three different geometries of stress concentrators 96. More specifically, the radius of curvature of the stress concentrator 96 in FIG. 4a is greater than the radius of curvature of the stress concentrator in FIG. 4b which in turn is greater than the radius of curvature of the stress concentrator illustrated in FIG. 4c. The stress concentrator 96 in FIG. 4a allows the first resilient section 84 to have increased flexibility and is suited for use with a hook 80 made from the most resilient and strong materials. The stress concentrator 96 illustrated in FIG. 4b, with an increased radius of curvature, reduces flexibility slightly from that illustrated in FIG. 4a and is suited for use with a hook made from less flexible and strong materials.

FIG. 4c illustrates the virtual elimination of the stress concentrator 96 and is suitable for use with a hook made from materials with high plastic deformation.

In the second embodiment of the hook 50 illustrated in FIGS. 2a-2e, the first inner radius $R_1$ and the living hinge 64 are spaced from the first distal end face 58 by a first distance $D_1$ while the second inner radius $R_2$ is spaced from the second distal end face 60 by a second distance $D_2$ where $D_1 > D_2$. The ratio of $D_1$ to $D_2$ is about 2:1 for the hook 50.

Similarly, in the third embodiment of the hook 80 illustrated in FIGS. 3a-3f, the first inner radius $R_1$ and the living hinge 94 are spaced from the first distal end face 88 by a distance $D_1$ and the second inner radius $R_2$ is spaced from the second distal end face 90 by a second distance $D_2$ where $D_1 > D_2$. The ratio of the distance $D_1$ of the first resilient section 84 to the distance $D_2$ of the second section 86 of the hook 80 is about 3:1. This serves to increase the flexibility of the first resilient section 84 compared to the first resilient section 54 thereby increasing the functional gap width of the gate 92 compared to the gate 62 when in the deflected position to allow thicker objects to be engaged in the hook 80 compared to the hook 50.

In all embodiments of the hook 10, 50, 80, the body 12, 52, 82 may be an integral single piece of molded plastic or composite material. Further, the ratio of the first inner radius $R_1$ to the second inner radius $R_2$ may be between 1:2 and 1:10.

All embodiments of the hook 10, 50, 80 incorporate the working principle of a carabiner clip into a plastic, injection molded body 12, 52, 82 that may be integrated to an interior trim panel 30, 106.

The hook 10, 50, 80 may be integrated, for example, as part of a C-pillar trim panel, a D-pillar trim panel, a quarter trim panel, a liftgate trim panel or the like. Together, the mounting lug 26, 68, 98, locating rib 28, 70, 100 and screw fastener 38, 110 received in the screw boss 36, 72, 102 constrain all degrees of freedom of the hook 10, 50, 80 relative to the trim panel. Where the hook 10, 50, 80 is designed to provide relatively high retention forces required by specific applications, the trim panel 30, 106 may be attached to the body sheet metal by use of metallic clips or bolts.

In all embodiments of the hook 10, 50, 80, the flexibility of the hook and, more particularly, the first resilient section 16, 54, 84 may be tuned by modifying the first inner radius $R_1$ and/or the length of the first resilient section. Both the first resilient section 16, 54, 84 and the second section 18, 56, 86 may feature an H-shaped cross section which helps reduce the weight of the part while maintaining high structural integrity.

In all embodiments of the hook 10, 50, 80, the second section 18, 56, 86 overlaps the first resilient section 16, 54, 84 (i.e., the second section extends outward beyond the first section). In other words, the second section 18, 56, 86 is more bulbous than the first section 16, 54, 84. This configuration provides a physical locking mechanism to limit displacement of the first resilient section and help keep engaged items securely locked within the opening formed within the hook until the first resilient section is purposely pushed to increase the gap width of the gate 24, 62, 92 and allow items to pass through it.

As should also be appreciated from reviewing FIGS. 2a and 3a, the screw bosses, 72, 102 on the respective bodies 52, 82 may be aligned with and provided directly across the bodies from the gates 62, 92. This allows the fastening screw to be aligned with the zone of the hook that bears loads thereby increasing the integrity of the connection.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hook, comprising:
   a body including a base, a first resilient section, a second section and a gate defined between said first resilient section and said second section, said base including a mounting lug and a locating rib, wherein said first resilient section has a first inner radius $R_1$ and said second section has a second inner radius $R_2$ where $R_1 < R_2$, wherein said first resilient section is displaceable between a home position providing said gate with a first gap width $W_1$ and a deflected position providing said gate with a second gap width $W_2$ where $W_1 < W_2$, and wherein said first resilient section has a first distal end face having a first length $L_1$ and said second section has a second distal end face having a second length $L_2$ where $L_1 > L_2$.

2. The hook of claim 1, wherein said gate extends between said first distal end face and said second distal end face.

3. The hook of claim 1, wherein said body is made from a single piece of molded plastic.

4. The hook of claim 1, wherein said first resilient section includes a living hinge.

5. The hook of claim 4, wherein said gate extends between said first distal end face and said second distal end face.

6. The hook of claim 5, wherein said second section overlaps said first resilient section.

7. The hook of claim 6, wherein said body further includes a screw boss.

8. The hook of claim 1, wherein said first inner radius $R_1$ is spaced from said first distal end face by a first distance $D_1$ and said second inner radius $R_2$ is spaced from said second distal end face by a second distance $D_2$ where $D_1 > D_2$.

9. The hook of claim 8, wherein a ratio of $D_1$ to $D_2$ is between 2:1 and 3:1.

10. The hook of claim 8, wherein a ratio of $D_1$ to $D_2$ is about 2:1.

11. The hook of claim 8, wherein a ratio of $D_1$ to $D_2$ is about 3:1.

12. A hook assembly, comprising:
    a hook having a body including a first resilient section, a second section and a gate defined between said first resilient section and said second section, wherein said body includes a screw boss aligned with and provided directly across from said gate across said body; and
    a concave housing having a receiver that receives and holds said body.

13. The hook assembly of claim 12, wherein said first resilient section includes a first inner radius and a stress concentrator.

14. The hook assembly of claim 13, wherein said first resilient section further includes a living hinge defined between the inner radius and the stress concentrator.

* * * * *